United States Patent [19]

Hunter

[11] 4,383,606

[45] May 17, 1983

[54] HYDROGEN STORAGE SYSTEM

[75] Inventor: James B. Hunter, Newtown Square, Pa.

[73] Assignee: Johnson Matthey, Inc., Malvern, Pa.

[21] Appl. No.: 218,119

[22] Filed: Dec. 19, 1980

[51] Int. Cl.³ .................... B65D 25/00; F17C 11/00; C01B 1/26; F16L 55/04
[52] U.S. Cl. .......................................... 206/0.7; 34/15; 62/48; 220/88 R; 423/648 R; 427/245
[58] Field of Search .................. 206/0.7; 220/88 R; 34/15; 62/48; 423/648 R; 427/245

[56] References Cited

U.S. PATENT DOCUMENTS

| 4,133,426 | 1/1979 | Truillon et al. | 206/0.7 |
| 4,135,621 | 1/1979 | Truillon et al. | 206/0.7 |
| 4,165,569 | 8/1979 | Mackay | 34/15 |
| 4,187,092 | 2/1980 | Woolley | 34/15 |
| 4,196,525 | 4/1980 | Ebdon et al. | 34/15 |
| 4,225,320 | 9/1980 | Gell | 206/0.7 |

FOREIGN PATENT DOCUMENTS 2015142A 9/1979 United Kingdom .

Primary Examiner—William T. Dixson, Jr.
Attorney, Agent, or Firm—Cushman, Darby & Cushman

[57] ABSTRACT

A hydrogen storage system is provided which will not substantially degrade over time. Each of a plurality of storage cells comprises a screen coated with a ceramic material which will allow passage of hydrogen, but prevent passage of submicron particles of a hydridable material such as LaNi₅. Charging and discharging of each cell may be accomplished by applying an electrical current to the screen material forming each cell.

35 Claims, 10 Drawing Figures

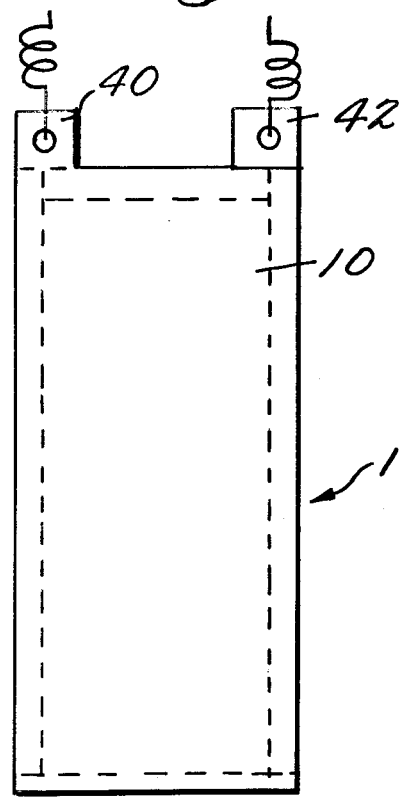
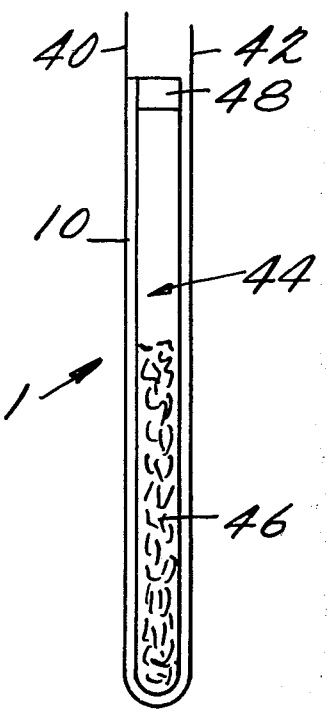
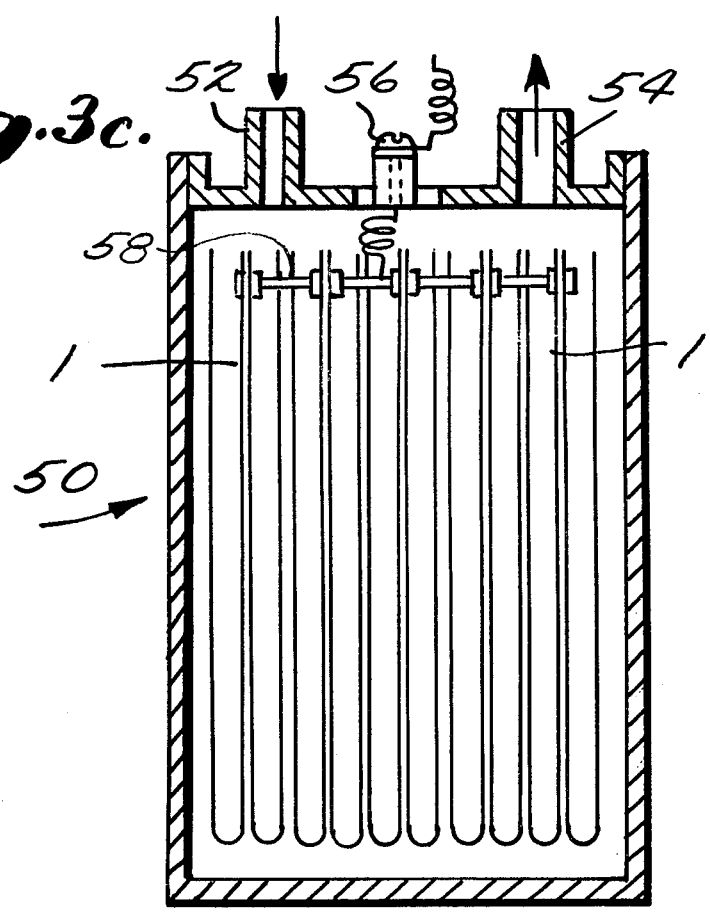

HYDROGEN STORAGE SYSTEM

BACKGROUND AND SUMMARY OF THE INVENTION

The present invention generally relates to a system for safely storing hydrogen gas so that the hydrogen gas can be charged into the system, safely stored, and discharged from the system upon demand. More particularly, the present invention relates to storage cells which can be contiguously assembled to produce a hydrogen storage system.

Hydrogen gas, $H_2$, is a well known substance which has many advantageous characteristics. One such advantageous characteristic is that hydrogen gas can be utilized as a combustible fuel which is clean, efficient and produces no harmful product of combustion. Hydrogen gas when utilized as a combustible fuel yields water, $H_2O$, as a product of the combustion reaction.

However, an extreme disadvantage to the use of hydrogen as a combustible fuel relates to the extreme volatility inherent with hydrogen gas. Hydrogen is relatively stable at ordinary temperatures, but is extremely flammable in the presence of oxygen and reacts spontaneously when activated by a flame or electric spark, or in the presence of a suitable catalyst. The combustible reaction of hydrogen and oxygen to produce water is exothermic and will explode violently when the proper ratios of hydrogen and oxygen are ignited.

The inherent dangers in utilizing hydrogen as a fuel source has prevented hydrogen from becoming widely accepted as a commercially viable alternative to fossil fuels, such as, oil, natural gas or the like. Thus, it has been impractical to use hydrogen gas as an alternative fuel source since it would be extremely dangerous to store the hydrogen gas prior to beneficially using it as a fuel.

It has been proposed to contact hydrogen gas with a hydridable material such that the hydrogen gas is stored in the form of a hydride. This form of storage renders the hydrogen gas relatively inert thereby increasing the confidence and safety in using hydrogen as a fuel source. A typical storage system utilizing the hydride storage of hydrogen gas is disclosed in U.K. Pat. No. 2,015,142, the disclosure of which is incorporated herein by reference. Typical conventional storage systems provide a plurality of container-like storage cells with each cell utilizing a hydrogen gas permeable membrane. The hydridable material is stored within each of the individual storage cells such that the hydrogen gas introduced into the complete system permeates through the membrane and is stored in the form of a hydride therein.

A problem which has been associated with conventional hydrogen permeable membranes utilized in the individual storage cells is the possibility that the hydridable material will block the free permeation of hydrogen gas causing a sudden high pressure build up with the possibility of rupturing the storage system. The hydridable material conventionally used in such storage systems is Lanthanum Nickelide, $LaNi_5$, a Fe/Ti alloy or like material. The hydridable material, such as, for example, Lanthanum Nickelide is placed in the individual conventional storage cells and hydrogen gas is allowed to permeate into the crushed or powdered material.

The hydrogen gas when contacted with the Lanthanum Nickelide hydridable material forms a hydride. Hydridable materials, such as, for example, Lanthanum Nickelide and Titanium Iron, readily absorb hydrogen gas at room temperature after first being activated by an elevation of temperature. Once the hydrogen gas is charged in the system in the form of a hydride, it may be liberated or discharged by the addition of heat to the hydridable material. After a number of charge/discharge cycles, the Lanthanum Nickelide or similar hydridable material experiences an automatic comminution to submicron powders. It is the submicron powders of the hydridable material which, in some cases, can cause blockage of the permeable membrane associated with conventional hydrogen storage cells.

Therefore, according to the present invention, there is provided storage cells and systems utilizing a plurality of such storage cells whereby the hydrogen gas is allowed to permeate through the membrane associated with the storage cell while the submicron powders of a hydridable material are impermeable therethrough. This is accomplished according to the method and apparatus of the present invention basically by coating a screen, which may have a variety of forms, with a ceramic material which will allow the passage of hydrogen, but not the passage of submicron particles of the hydridable material such as $LaNI_5$. The ceramic material may comprise a fired aqueous binder solution which includes aluminum phosphate, a soluable chromium compound, and an organic amine compound, such as the commercially available "ALSEAL 502".

Thus, according to the present invention, a safe system of storing hydrogen gas is provided such that the possibility of cell rupture due to high pressure build-up is avoided. By utilizing a storage system according to the present invention, hydrogen gas can be confidently and safely relied upon on a commercially large scale basis as a reasonable alternative to fossil fuels. Thus, it is entirely conceivable that machinery or automobiles utilizing an internal combustion engine and equipped with a storage system according to the present invention will be able to use hydrogen gas as a safe, efficient, and clean fuel for power.

BRIEF DESCRIPTION OF THE DRAWINGS

FIG. 1b is a variation of the embodiment depicted in FIG. 1a;

FIG. 1c is an exterior elevational view of the variation of the embodiment depicted in FIG. 1a;

FIG. 3a is an elevational view of another embodiment of the present invention;

FIG. 3b is a cross sectional view of the embodiment depicted in FIG. 3a; and

FIG. 3c is a cross sectional view of a complete hydrogen storage system depicting a plurality of storage cells as depicted in FIG. 3a together with the associated enclosures.

DETAILED DESCRIPTION OF THE DRAWINGS

Figure 1A:
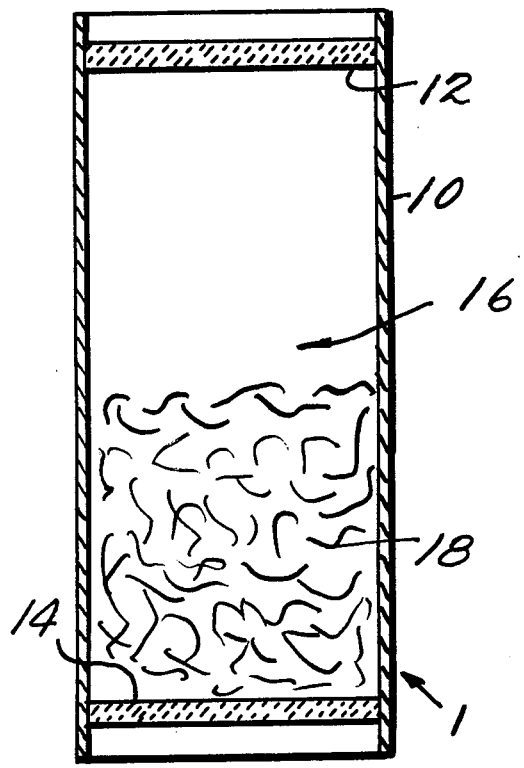
FIG. 1a is a cross sectional elevation view of an embodiment of an exemplary storage cell according to the present invention.

In the drawings the numeral 1 throughout generally refers to a single hydrogen storage cell, the numeral 10 throughout refers to a membrane structure, and the numeral 20 throughout refers to a gasket.

Referring specifically to FIG. 1a, it can be seen that one embodiment of the present invention generally comprises a circular hydrogen storage cell 1 which generally comprises a hydrogen gas permeable membrane 10 and two end plugs 12, 14.

The end plugs 12, 14 as depicted in FIG. 1a can be constructed of a solid or porous metal, ceramic or a ceramic screen composite material. The membrane 10 generally defines a cylindrical cavity 16 into which a hydridable material 18 such as, for example, LaNi$_5$, a Fe/Ti alloy, or like material, can be inserted. The membrane structure 10 generally comprises a wire mesh screen utilized as a substrate for a ceramic material which is coated thereon. Thus, although the figures depict a single material, it will be understood by one skilled in the art that the membrane is basically a composite of two materials.

A wire mesh screen which can be advantageously utilized in the present invention is produced from KANTHAL wire. "KANTHAL" as used herein refers to a proprietary product of the Kanthal Corporation and is commercially available in various grades. "KANTHAL" is a high electrical-resistance alloy which has the following general compositions in percent essential elements other than iron: carbon 0.06-0.09; chromium, 23-26; cobalt 2.0 minimum; and aluminum 4.5-5.7. The "KANTHAL" alloy exhibits tensile strength in pounds per square inch in the range of 106,000-114,000 and, additionally exhibits Brinell hardness in the range of 200-230. The "KANTHAL" screen preferably utilized in the present invention is constructed from about 0.005-0.016 inch diameter circular wire.

The term "ceramic material" as used herein describes a ceramic binder material which when coated upon a screen similar to that described above and fired at a temperature of about 1000° F. exhibits a strong, crack free ceramic with a high heat transfer conductivity. Several binder solutions are commercially available which can satisfactorily be utilized by the present invention. One such binder solution is "ALSEAL 500", a proprietary binder solution that may be obtained commercially from Coatings For Industries, Inc. "ALSEAL 500" is a dispersion of finally divided aluminum powder in an aqueous binder solution containing aluminum phosphate, a soluble chromium compound, and an organic amine compound. This product is sold primarily as a metal coating preparation designed to protect the surface of metals operating under oxidizing conditions at high temperature, such as, for example, the coating of aircraft turbine blades. In this regard, see U.S. Pat. No. 4,196,099 the disclosure of which is hereby incorporated by reference.

A binder solution similar to "ALSEAL 500" but which lacks the above mentioned aluminum power is additionally commercially available under the trade name "ALSEAL 502". "ALSEAL 502" can satisfactorily be utilized according to the present invention when compounded with a high density of alumina powder, such as, for example, "TABULAR ALUMINA" and having the crystal structure of corundum (Al$_2$O$_3$). "TABULAR ALUMINA" is a proprietary product of the Aluminum Company of America, ALCOA.

Figure 1B:
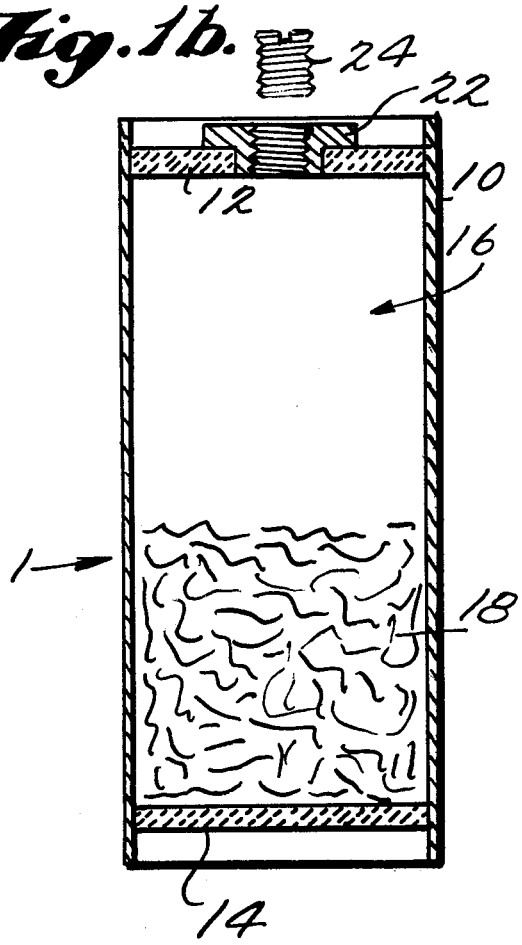

Referring to FIG. 1b, a variation of the embodiment depicted in FIG. 1a is shown wherein a threaded female member 22 is attached to end plugs 12. Associated with the threaded female member 22 is a threaded male member 24 which can be removeably inserted therein. When the threaded male member 24 is removed, hydridable material 18 can enter and exit the cylindrical cavity 16. A plan view of the embodiment depicted in FIG. 1b is shown in FIG. 1d.

Figure 1C:
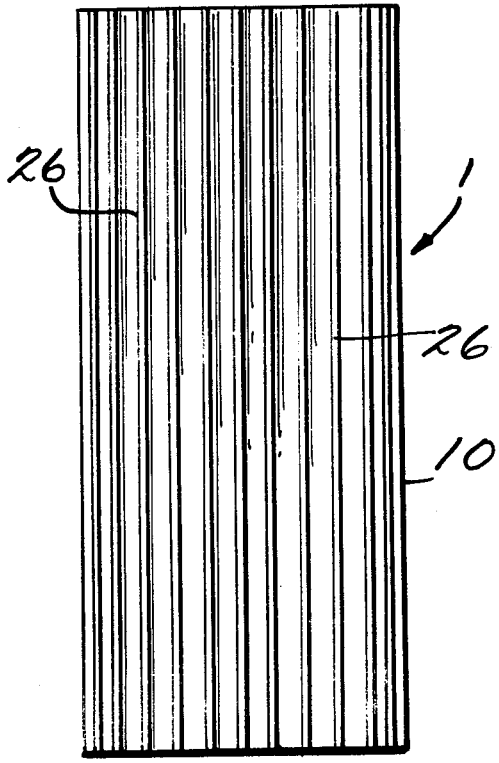
Figure 1D:
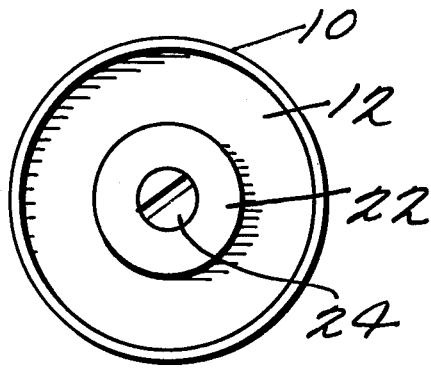
FIG. 1d is a top plan view of the hydrogen storage cell depicted in FIG. 1b.

FIG. 1c is an exterior elevational view of the embodiments of the present invention generally depicted in FIGS. 1a and 1b. The membrane 10 of the variation as depicted in FIG. 1c, however, comprises a plurality of corrugated ribs 26 around the entire circumference of the cylindrical storage cell.

Figure 2A:
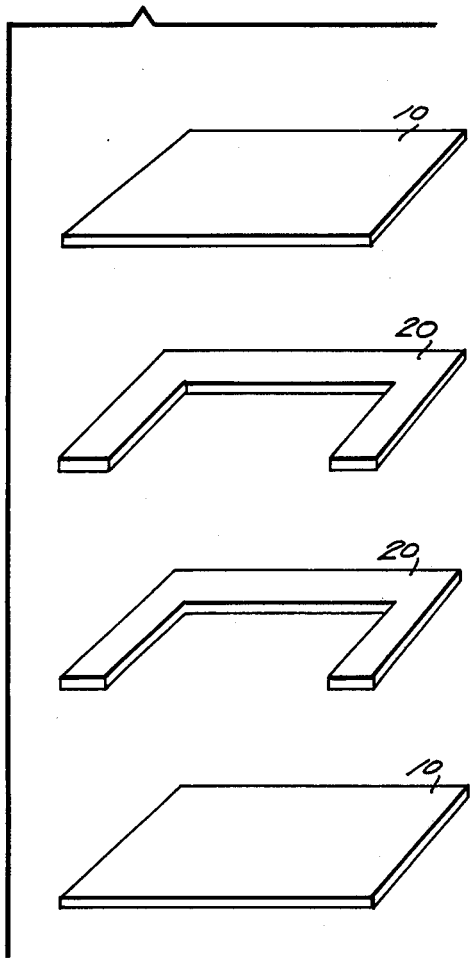
FIG. 2a is an exploded perspective view of another embodiment according to the present invention showing the various parts associated therewith.

Referring now more specifically to FIG. 2a, wherein another embodiment of the present invention is depicted, the storage cell 1 is depicted as generally comprising two like planar membranes 10 and gaskets 20 interposed therebetween so as to separate the membranes 10 and creating a cavity 28 into which a hydridable material can be inserted. The assembled storage cell can be more clearly seen in FIG. 2b, wherein the cavity defined by the gasket and the opposing membranes is shown as numeral 28. It should be particularly noted that in this embodiment, the gasket 20 extends along three interior edges of the membranes 10 and is open at one end. The gaskets 20 are securely cemented to each of the membranes 10 with a suitable cement, such as, for example, "ALSEAL 512", a commercially available proprietary product of Coatings For Industries, Inc. Matthey Inc. plus "TABULAR ALUMINA". The gasket 20 material is electrically nonconductive and, preferably, is constructed from such material as asbestos paper or the like.

Figure 2C:
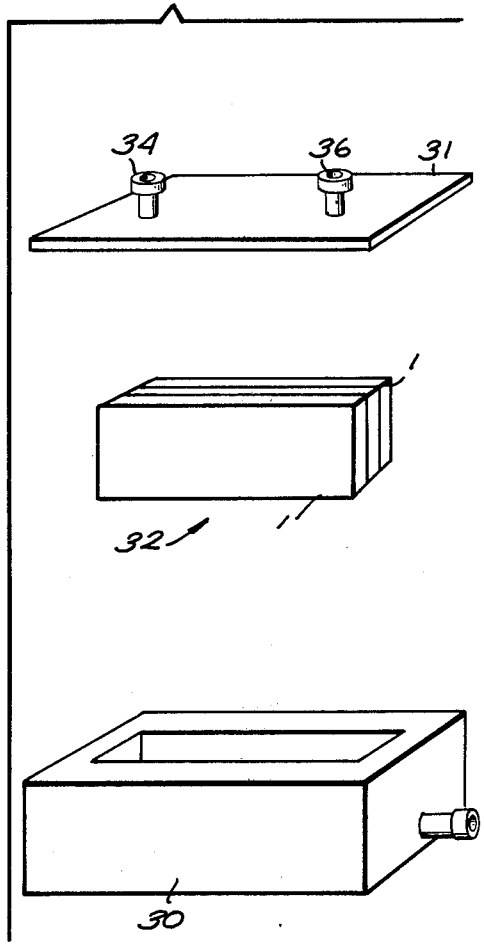
FIG. 2c is a perspective view of a complete hydrogen storage system including a plurality of storage cells such as depicted in FIG. 2b together with an associated enclosure.
Figure 2B:
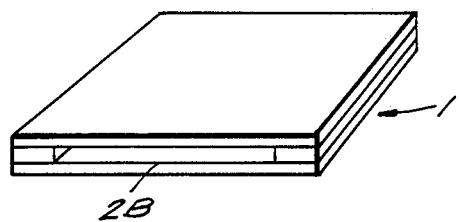
FIG. 2b is a perspective view of the elements depicted in FIG. 2a in an assembled mode.

A plurality of the individual storage cells 1 as depicted in FIGS. 2a and 2b can be assembled contiguously and inserted into a suitable enclosure 30. The contiguously stacked individual storage cells 1 can be more clearly seen in FIG. 2c and are depicted by numeral 32. The enclosure 30 is preferably constructed from a light weight material, such as, for example aluminum and is provided with a sealing member 31 which contains fittings 34 and 36 suitable for the introduction of hydrogen gas into the storage system and the discharge of hydrogen gas therefrom, respectively.

An additional embodiment of the present invention is depicted in FIG. 3a. The storage cell 1 as depicted in FIG. 3a is generally a U-shaped membrane 10 formed about one of its central axes as more clearly shown in the cross-sectional elevational view of FIG. 3b. The storage cell 1 according to the embodiment of FIG. 3a is provided with electrical connections 40, 42 to the membrane 10 so that an electrical current can be supplied to the membrane 10. The electrical current thus supplied to the membrane 10 will necessarily cause the electrical-resistance alloy in the membrane 10 to become heated thereby causing the hydrogen gas stored in the cell cavity in the form of a hydride to be liberated. The released hydrogen gas can thus permeate through the membrane 10 while the submicron powders of the hydridable material are impermeable. It should be understood that all embodiments of the present invention utilize a source of heat to liberate the hydrogen gas from the hydridable material, whether it be in the form of electrical energy, the heat from combustion gases, or the like.

FIG. 3b depicts a cross sectional elevational view of the storage cell depicted in FIG. 3a and more clearly shows the cavity 44 into which the hydridable material 46 can be inserted. A gasket 48 comprises generally three sides of the storage cell of this embodiment and is electrically nonconductive. The gasket 48 utilized in the present embodiment depicted in FIG. 3b can be, for example, asbestos paper or like material.

A plurality of storage cells 1 of the embodiment as depicted in FIGS. 3a and 3b can be contiguously assembled and placed in an appropriate enclosure 50 as more clearly depicted in the cross sectional elevation of FIG. 3c. The enclosure 50 is preferably constructed from a light weight material, such as, for example, aluminum and is provided with an inlet 52 and outlet 54 for charging and discharging hydrogen gas, respectively. Additionally, an electrical connection 56 is provided on the exterior of the enclosure 50 which will transmit an electrical current to each individual storage cell 1 by way of a bus bar 58 or the like.

Thus, while the invention has been herein described in what is presently conceived to be the most practical and preferred embodiments thereof, it will be apparent to the those of ordinary skill in the art that many modifications may be made thereof within the scope of the invention, which scope is to be accorded the broadest interpretation of the appended claims so as to encompass all equivalent assemblies, structures and methods.

What I claim is:

1. In a storage system for storing hydrogen gas, a storage cell comprising:
    a membrane structure generally cylindrical in shape and defining a cylindrical cavity adapted to accepting a volume of hydridable material therein, and comprising: screen means and means for coating said screen means so that said membrane structure is permeable to hydrogen gas and impermeable to a hydridable material said coating means being a ceramic material formed by firing an aqueous binder solution comprising a powder containing aluminum, aluminum phosphate, a soluble chromium compound, and an organic amine compound; and means for plugging said cylindrical membrane structure opposingly disposed and fixedly attached at each end of said cylindrical membrane structure so that said cylindrical cavity is completely enclosed.

2. In a storage system for storing hydrogen gas, a storage cell comprising:
    at least two substantially planar membrane structures, each of said membrane structures comprising: screen means and means for coating said screen means so that each of said membrane structures is permeable to hydrogen gas and impermeable to a hydridable material; and
    gasket means for separating said at least two membrane means and for sealing at least three interior surfaces of each of said membrane structures thereby disposing said membrane structures along opposing parallel planes and defining a cavity therebetween, said cavity being enclosed on at least three sides by said gasket means and being exposed on the remaining side for accepting a volume of a hydridable material therein.

3. In a storage system for storing hydrogen, a storage cell comprising;
    a membrane structure, said membrane structure being formed in a general U-shape about a central axis and comprising: screen means; and means for coating said screen means so that said structure is permeable to hydrogen gas and impermeable to a hydridable material; and
    gasket means sealed to at least a portion of the interior surfaces of said U-shaped membrane structure and enclosing a cavity defined by said gasket means and said U-shaped membrane structure, said cavity for accepting a volume of a hydriable material therein.

4. A storage system for hydrogen gas, comprising:
    a plurality of storage cells; and means for enclosing said plurality of storage cells so that hydrogen gas can be charged thereinto and discharged therefrom, wherein each storage cell comprises:
    a generally cylindrical membrane structure comprising screen means and means for coating said screen means so that it is permeable to hydrogen gas and impermeable to a hydridable material said coating means being a ceramic material formed by firing an aqueous binder solution comprising a powder containing aluminum, aluminum phosphate, a soluble chromium compound, and an organic amine compound; and
    means for plugging said cylindrical membrane structure opposingly disposed and fixedly attached at each end of said cylindrical membrane structure so that a cavity defined by said cylindrical structure is completely enclosed.

5. A storage system for storing hydrogen gas, comprising:
    a plurality of storage cells;
    means for enclosing said plurality of storage cells so that hydrogen gas can be charged thereinto and discharged therefrom, wherein each storage cell comprises:
    at least two substantially planar membrane structures, each of said membrane structures comprising screen means and means for coating said screen means so that each of said membrane structures is permeable to hydrogen gas and impermeable to a hydridable material; and
    gasket means for separating said at least two membrane structures, and being sealed to a portion of at least three interior surfaces of each of said membrane structures thereby disposing said membrane structures along opposing parallel planes defining a cavity therebetween, said cavity being enclosed on at least three sides by said gasket means and being exposed on the remaining side for accepting a volume of hydridable material therein.

6. A storage system for hydrogen gas, comprising:
    a plurality of storage cells;
    means for enclosing said plurality of storage cells so that hydrogen gas can be charged thereinto and discharged therefrom, wherein each storage cell comprises:
    a generally U-shaped membrane structure comprising screen means and means for coating said screen means so that it is permeable to hydrogen gas and impermeable to a hydridable material; and
    gasket means sealed to at least a portion of the interior surfaces of said U-shaped membrane structure and enclosing a cavity defined by said gasket means and said U-shaped membrane structure, the cavity accepting a volume of a hydriable material therein.

7. In a storage system as recited in claims 1, 2, 3, 4, 5 or 6, wherein each storage cell further comprises an electrical connection means for conducting an electrical current to said membrane structure so that hydrogen gas releasably stored as a hydride in the hydridable material is liberated and permeated through said membrane structure.

8. In a storage system as recited in claims 4, 5 or 6, wherein the enclosing means comprises a first means for charging the cells with hydrogen gas and a second means for discharging hydrogen gas from the cells.

9. In a storage system as recited by claim 7 wherein the screen means of said membrane structure is a #18 mesh screen produced from wire of an electrical-resistance metal alloy.

10. In a storage system as recited by claim 7 wherein the screen means of said membrane structure is a #30 mesh screen produced from wire of an electrical-resistance metal alloy.

11. In a storage system as recited in claims 2 or 3, wherein the coating means is a ceramic material formed by firing an aqueous binder solution.

12. In a storage system as recited in claim 11, wherein the aqueous binder solution comprises a powder containing aluminum; aluminum phosphate; a soluble chromium compound; and an organic amine compound.

13. In a storage system as recited in claim 9, wherein the wire mesh screen is constructed from about 0.005-0.016 inch diameter circular wire.

14. In a storage system as recited in claims 2, 3, 5 or 6, wherein the gasket means comprises an asbestos gasket.

15. In a storage system as recited in claim 1, wherein said plugging means comprises a plurality of metal plugs.

16. In a storage system as recited in claim 1, wherein said plugging means comprises a plurality of ceramic material plugs.

17. In a storage system as recited in claim 1, wherein said plug means comprises a plurality of ceramic coated metal screen composite material plugs.

18. In a storage system as recited in claim 1, wherein said cylindrical membrane structure is corrugated.

19. In a storage system as recited in claim 1, wherein said plugging means includes at least one plug having an opening for adding and removing the hydridable material enclosed within the cylindrical cavity.

20. In a storage system as recited in claim 19, wherein the opening is defined by a threaded female member fixedly attached to said plug and a removably threaded male member communicable with said female member.

21. In a storage system as recited in claims 1, 2, 3, 4, 5 or 6, wherein the hydridable material is LaNi$_5$ or Fe/Ti alloy.

22. In a storage system as recited in claim 7, wherein the coating means is a ceramic material formed by firing an aqueous binder solution.

23. In a storage system as recited in claim 22, wherein the aqueous binder solution comprises a powder containing aluminum, aluminum phosphate, a soluble chromium compound, and an organic amine compound.

24. A method of releasably storing hydrogen gas in a system comprising a plurality of enclosed storage cells, comprising the steps of:
(a) charging the system with hydrogen gas so that the gas permeates through a membrane structure of each storage cell, the membrane structure comprising an electrically resistive wire mesh screen coated with a ceramic material;
(b) contacting the hydrogen gas with a hydridable material enclosed within each storage cell so that the hydrogen gas is stored therein in the form of a hydride;
(c) supplying an electrical current to the membrane structure to release the hydrogen gas from the hydridable material; and
(d) discharging the hydrogen gas formed in step (c) so that the gas permeates through the membrane structure of each storage cell without the submicron powders of the hydridable material permeating the membrane structure.

25. A method as recited in claim 24, wherein the hydridable material is LaNi$_5$ or Fe/Ti alloy.

26. A method as recited in claim 24 wherein the ceramic material comprises a binder solution comprising a powder containing aluminum; aluminum phosphate; a soluble chromium compound; and an organic amine compound.

27. A membrane that permits hydrogen gas to permeate therethrough but does not permit submicron particles of a hydridable material to permeate therethrough comprising:
screen means; and
means for coating said screen means so that the membrane is permeable to hydrogen gas and impermeable to submicron powders of hydridable material wherein the coating means is a ceramic material formed by firing an aqueous binder solution at 1000° F., the binder solution comprising a powder containing aluminum, aluminum phosphate, a soluble chromium compound, and an organic amine compound.

28. A membrane as recited in claim 27 wherein the screen means is a #18 mesh screen produced from wire of an electrical-resistance metal alloy.

29. A membrane as recited in claim 27 wherein the screen means is a #30 mesh screen produced from wire of an electrical-resistance metal alloy.

30. A method of producing a membrane that is permeable to hydrogen gas but is impermeable to submicron particles of a hydridable material comprising the steps of;
(a) coating an electrically-resistive wire mesh screen with an aqueous binder solution; and
(b) firing the screen coated according to step (a) to obtain a ceramic material that is permeable to hydrogen gas but impermeable to submicron particles of a hydridable material.

31. A method as recited in claim 30 wherein step (b) is practiced at about 1000° F.

32. A method as recited in claim 30 wherein the screen is a #18 mesh screen.

33. A method as recited in claim 30 wherein the screen is a #30 mesh screen.

34. A method as recited in claim 30 wherein the aqueous binder solution comprises aluminum phosphate; a soluble chromium compound; and a ceramic amine compound.

35. A method as recited in claim 30 wherein the aqueous binder solution comprises an alumina powder having a crystal structure corresponding to that of corundum; a soluble chromium compound; and an organic amine compound.

* * * * *